United States Patent [19]

Cooper

[11] 4,376,186

[45] Mar. 8, 1983

[54] THERMOPLASTIC COMPOSITION HAVING IMPROVED IMPACT MODIFIER AND PROCESS FOR PRODUCTION

[75] Inventor: Glenn D. Cooper, Delmar, N.Y.

[73] Assignee: General Electric Company, Pittsfield, Mass.

[21] Appl. No.: 210,643

[22] Filed: Nov. 26, 1980

[51] Int. Cl.$^3$ .............................................. C08L 61/04
[52] U.S. Cl. ...................................... 525/68; 524/504; 525/92; 525/132; 525/139; 525/144
[58] Field of Search ................... 525/68, 92, 132, 139, 525/144; 260/33.6 A; 524/504

[56] References Cited

U.S. PATENT DOCUMENTS

| | | | |
|---|---|---|---|
| 3,383,435 | 5/1968 | Cizek | 525/132 |
| 3,639,508 | 2/1972 | Kamboer | 525/92 |
| 4,128,602 | 12/1978 | Katchman et al. | 525/68 |

Primary Examiner—J. Ziegler
Attorney, Agent, or Firm—Hedman, Casella, Gibson, Costigan & Hoare

[57] ABSTRACT

A thermoplastic composition having an improved impact modifier is described. In an admixture of polyphenylene ether and butadiene-modified alkenyl aromatic resin, a resin which is a network polymer combining poly-alkenyl aromatic and polybutadiene membrane is employed. On subjection to high shear, the continuous membrane phase is shredded into discrete segments which impart an increased impact strength to the composition.

11 Claims, No Drawings

THERMOPLASTIC COMPOSITION HAVING IMPROVED IMPACT MODIFIER AND PROCESS FOR PRODUCTION

BACKGROUND OF THE INVENTION

Polyphenylene ethers are known and described in numerous publications including U.S. Pat. Nos. 3,306,874 and 3,306,875 of Allan S. Hay and U.S. Pat. Nos. 3,257,357 and 3,257,358 of Gelu Stamatoff. The high molecular weight polymers are high performance engineering thermoplastics possessing relatively high melt viscosities and softening points (i.e., in excess of 275° C.) and are useful for many commercial applications requiring high temperature resistance including formation of film, fiber and molded articles.

While their high performance properties are most desirable, the relatively high melt viscosities and softening points of these polyphenylene ethers are often a disadvantage. For example, although they may be employed to produce superior molded articles by melt processing techniques, the high temperatures required are undesirable.

Because of low cost and an overall combination of fair to good properties, alkenyl aromatic resins such as polystyrene have found wide and diversified commercial acceptance. However, such resins are usually brittle, possess relatively low heat distortion temperatures and have relatively poor resistance to the more common organic solvents.

Thermoplastic compositions containing polyphenylene ether (or oxide) in admixture with alkenyl aromatic resins resolve many of the drawbacks of these two individual resins. Examples are, for instance, described in U.S. Pat. No. 3,383,435 of Eric P. Cizek, the disclosure of which is incorporated herein by reference. Such compositions are most generally employed in the production of molded and/or extruded articles.

It is known in the art that various of these properties of these compositions may be further improved by copolymerizing the alkenyl aromatics with other monomers or by blending with other resins. Modifiers such as butadiene, for example, are customarily incorporated into the alkenyl aromatic resins to improve the properties of the resultant compositions. Such modified resins provide means for overcoming various physical drawbacks of alkenyl aromatic resins, particularly polystyrene, while simultaneously facilitating the processing of polyphenylene ethers.

As is described in the art, butadiene modification of alkenyl aromatic resins may take many forms. Polybutadiene or copolymers partially derived from butadiene may be graft, block or otherwise polymerized with such alkenyl aromatic resins. The resultant product may also be unsaturated or saturated (for example, by subsequent hydrogenation) without loss of desirability.

Despite the varied and diverse means for preparing these modified resins, the prior art approaches have generally involved polymerization techniques which developed a continuous alkenyl aromatic phase containing a discrete and discontinuous butadiene phase. These approaches are known to result in improved polyphenylene ether compositions.

An alternative butadiene modified-polyalkenyl aromatic form of resin—i.e., one in which there is a continuous phase including butadiene—is known. Their preparation is described in *Polymer Engineering and Science*, Vol. 17, page 498. Such resins have not, however, been employed with polyphenylene ethers. No substantial uses have been found for them and they have therefore been largely ignored.

It has now been discovered that this latter class of modified resins may be utilized in producing improved polyphenylene ether compositions. Such compositions, incorporating butadiene-modified alkenyl aromatic derived from a resin having a continuous phase which is butadiene-based, exhibit highly desirable impact strengths and other physical and processing properties.

INTRODUCTION TO THE INVENTION

The present invention relates to improved thermoplastic compositions comprising an admixture of polyphenylene ether and butadiene-modified alkenyl aromatic resin. For these compositions, the butadiene-modified resin is a network polymer combining polyalkenyl aromatic and polybutadiene membrane. On being subjected to high shear, the continuous membrane phase is shredded into discrete segments which impart an increased impact strength to the composition.

DESCRIPTION OF THE INVENTION

The polyphenylene oxide and modified resin useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are of the formula:

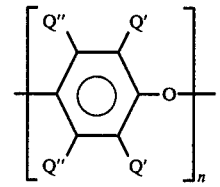

wherein Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, Q' and Q'' are the same as Q and in addition, halogen with the proviso that Q and Q' are preferably free of a tertiary carbon atom; and n is an integer of at least 50.

Especially preferred is poly(2,6-dimethyl-1,4-phenylene) ether.

The alkenyl aromatic resins are likewise well known and are preferably derived from monomers of the formula:

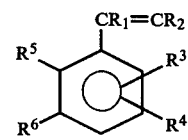

wherein $R^1$ and $R^2$ are selected from the group consisting of lower alkyl or alkenyl groups of from 1 to 6 carbons. $R^3$ and $R^4$ are selected from the group consisting of chloro, bromo, hydrogen and lower alkyl of from 1 to 6 carbon atoms. $R^5$ and $R^6$ are selected from the group consisting of hydrogen, halogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, chlorostyrene, alpha-methylstyrene, vinyl xylene, divinyl-benzene and vinyl naphthalene.

These components of the present compositions may be admixed in any proportion. Widely divergent proportions are known for such types of composition. More desirably, they are in a weight ratio of from about 1:5 to 5:1, most preferably about 1:1 for use in the present compositions.

The modified resins utilized in accordance with the present invention are network polymers combining polyalkenyl aromatic and polybutadiene membrane. These network polymers are characterized in that, upon initial formation, they exhibit a continuous phase of polybutadiene membrane. This membrane envelops a phase of polyalkenyl aromatic which may either be in discontinuous or continuous form.

The key portion of these network polymers, the membrane, may consist essentially of polymerized butadiene (by which term it is meant to include alkyl derivatives of butadiene such as isoprene). In addition, however, other monomers may be incorporated in addition to the butadiene. Most commonly, for example, monoolefin such as styrene is included to form polybutadiene interpolymer.

In the polyalkenyl aromatic resins of the present invention, about 3 to 15% and preferably about 6% to 10% of modifier by total weight is employed. This amount of, for example, polybutadiene provides optimization of composition properties. These network polymers may be produced by a variety of known techniques. Butadiene can, for example, be polymerized without stirring in a solution of polyalkenyl aromatic. Alternatively, stirring of such reagents may be interrupted prior to phase inversion and polymerization completed under low shear.

Another class of network polymers can be made by swelling cross-linked polybutadiene with alkenyl aromatic monomer and then polymerizing the monomer. Polymers of this type are known as semi-interpenetrating network polymers.

The polyphenylene ether and modified resin may be mixed in any manner. For ultimate application, the admixture should be essentially homogeneous. Even a heterogeneous composition may be prepared initially since it has been found that conventional molding and/or extrusion to final form will provide sufficient high shear to break down the membranous matrix (or cellular structure) and produce an essentially homogeneous composition.

In the resultant homogeneous composition, the polyphenylene ether and polyalkenyl aromatic resin become the only continuous phase. However, the formerly continuous phase of polybutadiene membrane is residually evidenced by discrete segments of the membrane dispersed essentially uniformly within the composition.

These segments of the matrix membrane commonly consist of small, isolated sheets or the like, dependant on the physical configuration that the membrane originally exhibited when continuous and intact. They are ordinarily less than about 5, most desirably from about 1 to 2, microns across; less than about 500, most desirably from about 100 to 300, Angstroms in thickness. Even in segment form, the polybutadiene membrane retains the rubbery characteristics of the initial network polymer.

Once prepared, the present composition may be utilized for any of the diverse purposes for which similar polyphenylene oxide/polyalkenyl aromatic resin compositions have already been employed. They are most commonly used in molding powder formulations, either alone or mixed with other polymers such as the polyolefin. They may also contain various conventional fillers to make molded parts. They are ordinarily used to prepare molded (by injection or compression) or extruded articles. These articles may possess a broad spectrum of forms including sheets, rods, etc.

The present composition may also contain such additional ingredients as dyes, pigments, stabilizers, plasticizers, fire retardants etc. All these may be incorporated in conventional manner for the purposes for which they are known.

The following examples are given by way of illustration only and are not intended as a limitation on the scope of this invention. Many variations are possible without departing from its spirit and scope. Unless otherwise specified herein, all proportions are provided on a weight basis.

EXAMPLE I

A solution of 60 g of XPRO-C-502 rubber, a low molecular weight, high cis polybutadiene rubber made by Polysar, Ltd., in 940 g of styrene is transferred to a 4 liter stainless steel reaction vessel with 1.2 g of tert-butyl peracetate and stirred, under nitrogen, for three hours at 100° C. The mixture is suspended in 1500 ml of hot water containing 4 g of poly (vinyl alcohol) and 3 g of gelatin. 3 g of di-tert-butyl peroxide is added and the polymerization is completed by heating for one hour at 100° C., two hours at 120°, 1 hour at 140° and finally for two and one-half hours at 155° C. The mixture is cooled and the product, in the form of fine beads, is filtered off, washed with water, and dried.

One gram of the polymer beads is stirred overnight with 25 ml of toluene. The polymer beads swell, but do not disintegrate, a characteristic of rubber polystyrene systems in which the continuous phase is made up of cross-linked rubber. A portion of the beads is compression molded into a ⅛" sheet and examined in thin section by transmission electron microscopy after staining with osmium tetroxide. It has a cellular, structure with the continuous rubber or polybutadiene phase forming a continuous network.

EXAMPLE II

A mixture of 50 parts of polyphenylene ether, 50 parts of the polymer prepared in Example I, 3 parts of triphenyl phosphate, 1 part of tridecyl phosphite, 1.5 parts of polyethylene, 0.15 parts of zinc sulfide and 0.15 parts of zinc oxide is extruded in a twin-screw extruded and then molded into ⅛" Izod test bars in a screw injection molding machine. One gram of the molded plastic is cut into small pieces and stirred overnight in 25 ml of toluene. The suspension is transferred to a tared centrifuge tube and centrifuged for 70 minutes at about 12,000 rpm. The liquid phase is decanted and the residue resuspended in 50 ml of toluene for one day, then again centrifuged and the toluene solution decanted.

The weight of swollen gel is determined and the gel is dried under vacuum. The weight of toluene-insoluble gel, after correction for the small amount of insoluble zinc compound, is 7.0% of the sample, with a swelling index of 13.1. The swelling index is typical of that of the rubbery phase in ordinary high impact polystyrene, while the amount of gel (7.0%, compared to 2.9% calculated from the weight of rubber present) indicates that the rubber is grafted with polystyrene to about the same extent as in ordinary high impact polystyrene. The product differs from that made from ordinary high impact polystyrene in the morphology of the rubber phase. Transmission electron microscopy of the molded material shows that the rubber membranes of the polystyrene were broken into individual, well dispersed thin sheets, about one to two microns long and only a few hundred Angstroms in thickness.

The notched Izod impact strength of the 50:50 composition is shown below in the Table, along with that of two 50:50 compositions made with polystyrenes containing other modifier rubbers as the dispersed phase. The polystyrenes were extruded, when necessary, with Dylene 8G polystyrene homopolymer to make the rubber content six percent in each case.

TABLE

| Modified for Alkenyl Aromatic Resin | Izod Impact (ft.lbs/inch of notch) |
|---|---|
| Example I | 3.7 |
| Foster-Grant 834 | 2.4 |
| Blendex 625 | 1.9 |

These comparative results show the unexpectly high increase in impact strength conferred upon the present compositions by the present network polymer over conventionally modified polyalkenyl aromatic resins.

EXAMPLE III

A solution 180 g of Solprene 308, a block copolymer of butadiene and styrene, in 1620 g of styrene is placed in a stainless steel reactor with 2.16 g of dicumyl peroxide and 1.8 of tert-dodecyl mercaptan. The reactor is purged with nitrogen, pressurized to 15 psig with nitrogen, and stirred for four hours at 115° C. The mixture is suspended in 1500 ml of water containing 3.5 g of gelatin and 4.5 g of poly (vinyl alcohol) and polymerization is completed by heating the suspension for five hours at 120° C. and then for five hours at 140° C.

The resultant polymer beads are filtered off, washed with water, dried, and extruded in a single screw extruder. The extruded pellets are opaque. Examination by a transmission electron micrograph shows a network structure, with a continuous rubber phase.

A mixture of 80 parts of polyphenylene ether, 20 parts of extruded pellets described above, and 5 parts of triphenyl phosphate is extruded in the single-screw extruder and the extruded pellets then molded into standard test pieces with a screw injection molding machine. The product is almost transparent and moderately tough. A second examination by transmission electron micrograph shows that, during high shear extrusion with polyphenylene ether, the rubber network of the HIPS broke down. The product now contains rubber present as discrete small particles, mostly of the "capsule" or core shell type.

Testing provides the following data:

| | |
|---|---|
| Elongation | 52% |
| Tensile Yield Strength | 11,400 psi |
| Izod Impact Strength | 2.9 ft.lbs./inch of notch |
| Gardner Impact Strength | 175 in. lbs. |
| Heat Distortion Temperature | 289° F. |
| Average Burn Temp. UL-94 | 4.8 sec. |

All of the above mentioned patents and/or publications are incorporated herein by reference. Obviously, other modifications and variations of the present invention are possible, in the light of the above teachings. It is therefore, to be understood that changes may be made in the particular embodiments of the invention described which are within the full intended scope of the invention as defined by the appended claims.

I claim:

1. In a thermoplastic composition comprising an admixture of polyphenylene ether and butadiene-modified alkenyl aromatic resin, the improvement wherein said resin comprises network polymer combining polyalkenyl aromatic resin and polybutadiene membrane, wherein the polybutadiene membrane forms a continuous phase in said resin.

2. The composition of claim 1, wherein the polyphenylene ether and resin are in a weight ratio of from about 1:5 to 5:1.

3. The composition of claim 1, wherein the resin comprises from about 3 to 15% membrane by total composition weight.

4. The composition of claim 1, wherein the alkenyl aromatic resin comprises polystyrene.

5. The composition of claim 1, wherein the resin comprises discrete polybutadiene membrane segments dispersed within said composition.

6. The composition of claim 5, wherein the polyphenylene ether forms a continuous phase in said composition.

7. The composition of claim 5 wherein the polyphenylene ether and resin are in a weight ratio of from about 1:5 to 5:1.

8. The composition of claim 5 wherein the resin comprises from about 3 to 15% membrane segments by total composition weight.

9. The composition of claim 5 wherein the polyalkenyl aromatic resin comprises polystyrene.

10. A process for producing the composition of claim 5 comprising subjecting an admixture of polyphenylene ether and network polymer combining polyalkenyl aromatic resin and a continuous phase of polybutadiene membrane to high shear sufficient to produce discrete polybutadiene membrane segments.

11. The process of claim 10, wherein the composition is molded.

* * * * *